United States Patent

[11] 3,622,586

[72] Inventor Zdravko Jezic
  Midland, Mich.
[21] Appl. No. 826,727
[22] Filed May 21, 1969
[45] Patented Nov. 23, 1971
[73] Assignee The Dow Chemical Company
  Midland, Mich.

[54] PYRIDYLIODONIUM SALTS
  8 Claims, No Drawings
[52] U.S. Cl. .................................................... 260/295 S,
  260/294.8 R, 260/295 AM, 260/297 R, 260/999,
  260/294.8 D
[51] Int. Cl. ..................................................... C07d 31/44,
  C07d 31/48
[50] Field of Search .......................................... 260/297 R,
  295 S, 295 AM, 294.8 R, 294.8 D

[56] References Cited
  UNITED STATES PATENTS
  3,509,165  4/1970  Ellzey et al. .................  260/295

Primary Examiner—Alan L. Rotman
Attorneys—Griswold & Burdick, John L. Spalding and Theodore Post ABSTRACT: Pyridyliodonium salts corresponding to the formula

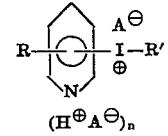

wherein R represents hydrogen, a lower alkyl, an acetamido, a chloro or a bromo group, R' represents naphthyl, thienyl, phenyl, lower alkylphenyl, lower alkoxyphenyl, phenylphenyl, phenoxyphenyl, di-substituted phenyl in which the substituents are lower alkyl or lower alkoxy, A represents fluoride, chloride, bromide, iodide, trifluoroacetate, trichloroacetate, lower alkanoate, nitrate, acid sulfate, or tetrafluoroborate and $n$ is an integer from 0 to 1. The compounds are useful as antimicrobials for the inhibition and control of the growth of bacterial and fungal organisms.

PYRIDYLIODONIUM SALTS

SUMMARY OF THE INVENTION

The present invention concerns the pyridyliodonium salts corresponding to the following formula

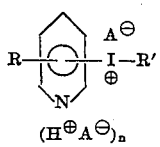

In this and succeeding formulas, R represents hydrogen, a lower alkyl, an acetamido, a chloro or a bromo group, R' represents napthyl, phenyl, lower alkylphenyl, lower alkoxyphenyl, phenylphenyl, phenoxyphenyl, disubstituted phenyl in which the substituents are lower alkyl or lower alkoxy, $A^{\ominus}$ represents fluoride, chloride, bromide, iodide, trifluoroacetete, trichloroacetate, lower alkanoate, nitrate, acid sulfate or tetrafluoroborate and $n$ represents an integer from 0 to 1. The terms "lower alkyl," "lower alkoxy" "lower alkanoate" refer to groups containing from one to four carbon atoms, such as methyl, ethyl, propyl, butyl, methoxy, ethoxy, propoxy, butoxy, acetate, propionate and butyrate. These compounds are crystalline solid materials which are somewhat soluble in many common organic solvents and in water. The compounds have been found to be of high toxicity to many fungal and bacterial organisms or plants including gram-negative and gram-positive types.

Representative pyridyliodonium salts include 3pyridyl-2-thienyliodonium salts, 5-(2-butylpyridyl)-(2-thienyl)iodonium salts, 5-(2-acetamidopyridyl)-(2-thienyl(iodonium salts, 5-(2-bromopyridyl)-(2-thienyl)-iodonium salts, 3-pyridyl-(2-naphthyl)iodonium salts, 5-(2-ethylpyridyl)-phenyliodonium salts, 5-(2-ethylpyridyl)-(p-ethylphenyl)iodonium salts, 5-(2-acetamido-pyridyl)-(p-methoxyphenyl)iodonium salts, 3-pyridyl-(p-biphenylyl)iodonium salts, 5-(2-chloropyridyl)-(p-phenoxyphenyl)iodonium salts, 3-pyridyl-(2,4-diethylphenyl)iodonium salts and 5-(2-cholorpyridyl)-(2,4-dimethoxyphenyl) iodonium salts. The term "salt" is used in this paragraph to identify the fluoride, chloride, bromide, iodide, nitrate, acid sulfate, trifluoroacetate, trichloroacetate, acetate, propionate, butyrate and tetrafluoroborate compounds.

The pyridyliodonium trifluoroacetates are prepared by reacting together trifluoroacetic acid, a 3-(diacetoxyiodo)pyridine and thiophene or naphthalene or benzene or a substituted benzene compound, i.e., an R'H compound, according to the following equation

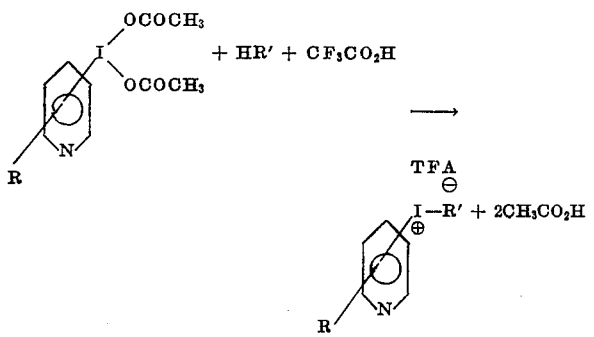

In the equation, and hereinafter, TFA is used to refer to trifluoroacetic acid, while TFA⁻ is used to refer to the anion of TFA. The reaction is advantageously carried out in glacial acetic acid or trifluoroacetic acid or in a mixture of glacial acetic acid and trifluoroacetic acid as reaction medium. In place of glacial acetic acid, chlorinated solvents such as, for example, methylene chloride, chloroform and methyl chloroform can be used. The reaction goes forward when the reagents are employed in any amounts. The reaction consumes the reagents in substantially equimolecular amounts and the employment of amounts which represent about equimolecular proportions is preferred, The reaction proceeds at an acetic acid liberating temperature, e.g., at a temperature of from about minus 30° to about plus 70° C. and is preferably carried out at a temperature of from about minus 20° to plus 40° C. Upon completion of the reaction, the desired pyridyliodonium trifluoroacetate is separatee by conventional procedures.

In a convenient method of carrying out the reaction, the (diacetoxyiodo)pyridine reagent is formed in situ by bringing together a 3-iodosopyridine and glacial acetic acid or a mixture of glacial acetic acid and acetic anhydride in which the (diacetoxyiodo)pyridine is formed and dissolved, to the resulting solution is added trifluoroacetic acid while cooling to ca. minus 20° C. and to the so obtained reaction mixture, maintained at ca. minus 20° C., the R'H reagent is added with stirring. The reaction is exothermic and goes forward readily with the addition of the addition of the R'H reagent. The temperature of the reaction mixture is controlled by regulating the rate of the addition of the R'H reagent and by external cooling. The reaction essentially is complete upon completion of the addition of the R'H reagent. Allowing the resulting mixture to stand for a period of time at somewhat elevated temperatures oftentimes gives some improvement in yield. Upon completion of the reaction, the reaction mixture may be distilled under reduced pressure to remove the low-boiling constituents. The residual oil, upon addition of ether, gives the desired pyridyliodonium trifluoroacetate as a crystalline residue. This residue may be further purified by crystallization from organic solvents such as, for example, acetone, ethyl acetate, or mixtures thereof with ether.

The pyridyliodonium trichloroacetates are prepared by substituting trichloroacetic acid for trifluoroacetic acid in the preceding reaction. Similarly, the acid sulfates are prepared by substituting sulfuric acid for trifluoroacetic acid in the first-described reaction.

The pyridyliodonium chlorides, bromides, chloride hydrochlorides and bromide hydrobromides are prepared from the corresponding trifluoroacetates by treatment of the trifluoroacetate with an appropriate gaseous or aqueous hydrogen halide. The amounts of the hydrogen halide reagents to be employed are not critical, some of the desired halides or hydrohalides being obtained when employing reagent in any proportions. However the reaction consumes the reagent in proportions of 1 or 2 moles of hydrogen chloride or hydrogen bromide per mole of trifluoroacetate, depending upon whether a chloride or chloride hydrochloride, or a bromide or bromide hydrobromide is formed, and the use of the reagent in amounts which represent such proportions is preferred. The formation of the halide hydrohalide salts is detected by infrared analysis (N–H⊕ absorption). The reaction takes place readily at temperatures of from 0° to 50° C. with the production of the desired pyridyliodonium chloride, chloride hydrochloride, bromide or bromide hydrobromide, respectively, and trifluoroacetic acid of reaction. During the reaction, the halide salts usually precipitate in the reaction mixture as a crystalline solid. Following the reaction, the desired salt product is recovered from the reaction mixture. Usually the product is washed with acetone to remove impurities therefrom and dried at room temperature.

The pyridyliodonium acetate, propionate, butyrate, nitrate, and tetrafluoroborate are prepared from the corresponding pyridyliodonium halides and conveniently from the corresponding chloride, In such operations, the corresponding pyridyliodonium halide is treated with silver nitrate, silver tetrafluoroborate or the silver salt of a lower alkanoic acid in water or aqueous alcohols as reaction media. There reaction takes place readily with the production of the desired pyridyliodonium salt product and silver halide. The methods of contacting the reagents and conditions of reaction are as described in the preceding paragraph. Upon completion of the reaction, the desired salt product is separated by decantation or filtration.

The pyridyliodonium fluoride salts are prepared in a similar manner by reacting a pyridyliodonium chloride with silver fluoride in an aqueous alcohol as reaction medium. The reaction takes place readily with the production of the desired pyridyliodonium fluoride salt product and silver chloride. The methods of contacting the reagents and conditions of reaction are as described in the preceding paragraph. Upon completion of the reaction, the desired fluoride salt product is separated from the reaction medium by decantation or filtration.

EXAMPLE 1: 3-PYRIDYL-2-THIENYLIODONIUM TRIFLUOROACETATE

3Iodosopyridine (55.3 g., 0.25 mole) is dissolved in glacial acetic acid (30 ml.), and acetic anhydride (150 ml.) and trifluoroacetic acid (77.5 ml., 1.0 mole) are added thereto with cooling to minus 20° C. Thiophene (42 g., 0.5 mole) dissolved in 125 ml. of acetic anhydride is added dropwise with stirring to the so-obtained mixture maintained at minus 20° C. over a period of 1 hour. The reaction mixture is stirred at minus 20° for an additional hour and allowed to warm up to 10° to 50° C. and stirred for an additional 6.5 hours. As stirring continues at the higher temperature, the reaction mixture gradually turns reddish-brown. Volatile components are removed under a pressure of 10-20 mm. Hg at at temperature of 50° to 60° C. To the oily residue, ether is added, crude product 3-pyridyl-2-thienyliodonium trifluoroacetate crystallizes out, is filtered off, washed with two 50 ml. proportions of ether and dried at room temperature. The mother liquor is diluted with acetone to an approximate total volume of 1.5 liters and treated with 10 ml. concentrated HCl to give the product as the 3-pyridyl-2-thienyliodonium chloride hydrochloride salt. It is filtered off, washed with acetone and dried. The chloride hydrochloride product is recrystallized from 95 percent ethanol. The crystalline precipitate is filtered off, washed twice with 95 percent ethanol and dried in vacuo at room temperature to give an off-white, fine crystalline solid melting at 183° to 184° C. with decomposition.

The 3-pyridyl-2-thienyliodonium trifluoroacetate crude is recrystallized from ethyl acetate to which decolorizing charcoal is added. The resulting solution is heated to boiling and Celite filter aid is added thereto and the solution is filtered. A light tan filtrate is obtained, which, upon standing, yields needlelike crystals which, when filtered, washed with a small amount of cold ethylacetate and dried at room temperature in vacuo, gives white needles which melt at 152° to 154° C. with decomposition. The recrystallized trifluoroacetate salt when dissolved in 25 ml. of acetone, filtered and treated with 20 percent aqueous sodium chloride with stirring gives a white crystalline solid precipitate. The precipitate is filtered off, washed with a small volume of cold water and a large volume of acetone and is dried at room temperature in vacuo. The resulting product, 3-pyridyl-2-thienyliodonium chloride, melts at 211° to 212° C. with decomposition.

Recrystallized 3-pyridyl-2-thienyliodonium trifluoroacetate is dissolved in 95 percent ethanol, filtered and the clear filtrate treated with a few drops of aqueous 48 percent hydrogen bromide. A white precipitate immediately forms which is stirred, cooled in an ice bath and filtered to remove crystalline precipitate. The crystals are washed with acetone, dried at room temperature in vacuo and the resulting 3-pyridyl-2-thienyliodonium bromide is found to melt at 194° to 196° C. with decomposition. The chloride, bromide, chloride hydrochloride and bromide hydrobromide products are identified by elemental and infrared analyses.

EXAMPLE 2: 3-PYRIDYL-(p-METHOXYPHENYL)IODONIUM CHLORIDE HYDROCHLORIDE

A mixture of 10 g. (45 moles) 3-iodosopyridine, 10 g. (93 mmoles) anisole and 50 ml. chloroform is stirred at room temperature and 10 ml. (15 g., 130 mmoles) TFA is added, dropwise, During addition of the TFA over a 5-minute period, the solid 3-iodosopyridine slowly dissolves, the solution turns a dark brown color and the temperature rises to 40° C. The brown solution is stirred until all the starting iodoso compound dissolves (ca. 15 min.). The solution is then evaporated to a red oil and diluted with 200 ml. ether. The solid which precipitates is filtered, yielding a tan solid, melting at 149°-150° (dec.). The infrared spectrum is consistent with (p-methoxyphenyl)-3-pyridyliodonium trifluoroacetate. The trifluoroacetate salt so obtained is dissolved in acetone; treated with decolorizing charcoal overnight; the charcoal is filtered off; the acetone is boiled off until crystallization begins; and the crystallized product is recovered and dried under vacuum. It melts at 155.5°-156.5° (dec.).

Small samples of the purified trifluoroacetate salt dissolved in acetone are converted to the bromide hydrobromide salt, melting at 171°-173° (dec.) and to the chloride hydrochloride salt melting at 212° C. (fast dec.) via HBr and HCl. These materials show N-H ⊕peaks at 2550 cm.$^{-1}$ for the bromide hydrobromide salt and 2380 cm.$^{-1}$ for the chloride hydrochloride salt. These salts are therefore indicated to be the 3-pyridyl-(p-methoxyphenyl)iodonium bromide hydrobromide and the 3-pyridyl-(p-methoxyphenyl)iodonium chloride hydrochloride, respectively.

EXAMPLE 3: 3-PYRIDYL-(p-PHENOXYPHENYL)IODONIUM BROMIDE

To a stirred mixture of 11 g. (0.05 mole) 3-iodosopyridine in 50 ml. chloroform is added 10 ml. (0.13 mole) of TFA. This dissolves the iodoso compound to give two layers to the mixture, an upper CHCl3 layer (colorless) and a lower yellow layer of 3-[bis(trifluoroacetoxy)ido]pyridine. To this stirred mixture there is then added 11 g. (0.065 mole) diphenyl ether followed by 5 ml. (0.065 mole) TFA. Within a few minutes, the reaction mixture darkens to a medium brown color.

The reaction mixture is evaporated and diluted with acetone. Addition of a small excess of aqueous 48% HBr to some of the acetone solution gives a white solid melting at 232°-235° (dec.). To the remainder of the acetone solution is added a small excess of hydrochloric acid to give a white solid, melting at 212°-214° (dec.). The same results can be achieved by treating the acetone solution with gaseous HCl or HBr. The infrared spectra of both the bromide and chloride salts shows no indication of carbonyl absorption and indicates that all trifluoroacetate salt is converted to the corresponding halide salt.

In similar procedures, the following compounds of the present invention are prepared. 3-pyridyl-(1naphthyl)iodonium trifluoroacetate, m.w. 445.18, by reacting 3-(diacetoxyiodo)pyridine with naphthalene.

3-pyridyl-(1naphthyl)iodonium chloride, m.w. 367.62, by reacting the corresponding trifluoroacetate salt with hydrogen chloride.

5-(2-ethylpyridyl)-(2-thienyl)iodonium fluoride, m.w. 335.13, by reacting the corresponding chloride salt with silver fluoride.

5-(2-acetamidopyridyl)-(p-methoxyphenyl)iodonium bromide, m.w. 449.10, by reacting the corresponding trifluoroacetate salt with hydrogen bromide.

5-(2-chloropyridyl)-(p-biphenylyl)iodonium trifluoroacetate, m.w. 505.67, by reacting 2-chloro-5-(diacetoxyiodo)pyridine with diphenyl.

5-(2-bromopyridyl)-(p-phenoxyphenyl)iodonium trifluoroacetate, m.w. 566.13, by reacting 2-bromo-5-(diacetoxyiodo)pyridine with diphenyl ether.

5-(2-bromopyridyl)-(p-phenoxyphenyl)iodonium chloride, m.w. 488.57, by reacting the corresponding trifluoroacetate salt with hydrogen chloride.

5-(2-methylpyrodyl)-(3,4-xylyl)iodonium trifluoroacetate, m.w. 437.20, by reacting 3-(diacetoxyiodo)-5-methylpyridine with o-xylene.

5-(2-methylpyridyl)-(3,4-xylyl)iodonium chloride, m.w. 359.64, by reacting the corresponding trifluoroacetate salt with hydrogen chloride.

5-(2-methylpyridyl)-(3,4-xylyl)iodonium tetrafluoroborate, m.w. 411.00, by reacting the corresponding chloride salt with silver tetrafluoroborate.

5-(2-acetamidopyridyl)-(3,4-diethoxyphenyl)-iodonium trifluoroacetate, m.w. 540.28, by reacting 2-acetamido-5-(diacetoxyiodo)pyridine with o-diethoxybenzene.

5-(2-methylpyridyl)-(3-ethyl-4-ethoxyphenyl)-iodonium trifluoroacetate, m.w. 481.25, by reacting 2-(diacetoxyiodo)-5-methylpyridine with o-ethoxyethylbenzene.

5-(2methylpyridyl)-(3-ethyl-4-ethoxyphenyl)-iodonium chloride, m.w. 403.69, by reacting the corresponding trifluoroacetate salt with hydrogen chloride.

5-(2-methylpyridyl)-(3-ethyl-4-ethoxyphenyl)-iodonium nitrate, m.w. 430.24, by reacting the corresponding chloride salt with silver nitrate.

The compounds of the present invention are useful as microbicides. They have high toxicity toward many bacterial organisms or plants including gram-negative and gram-positive types such as *Staphylococcus aureus, Salmonella typhosa, Bacillus subtilis, Escherichia coli, Pseudomonas aeruginosa, Candida pelliculosa, Aspergillus terreus* and *Aerobacter aerogenes*. This is not to suggest that all of the compounds are equally effective against the same organisms or at similar concentrations. The compounds may be applied to many bacterial plants and their habitats in bactericidal amounts to obtain excellent controls of the microbial organisms which attack the seeds, roots or above-ground portions of terrestrial plants. For such uses, the unmodified compounds can be employed. The compounds can also be dispersed on an inert finely divided solid and employed as dusts. Such mixture can also be dispersed in water with or without the aid of a surface active agent and employed as sprays. In other procedures, the products can be employed as active constituents in solvent solutions, aqueous dispersions or oil-in-water and water-in-oil emulsions. Good results are obtained with methods employing and compositions containing microbicidal or antimicrobial amounts of the novel compounds. Preferred compositions contain from 0.1 to 50 percent by weight of compound. The compounds may be included in adhesives, cooling waters, inks, plasticizers, latices, resinous polymers, fuels, greases, soaps, detergents, cutting oils and oil or latex paints to prevent mold and mildew and the degradation of such products resulting from microbial attack. Also, it has been discovered that the compounds advantageously may be distributed in textiles, fabrics, and paper or other cellulosic products, or may be employed in the impregnations of wood, lumber, wallboard and plaster to protect such products form the attack of the bacterial organisms of rot, mold, mildew and decay.

The exact concentration of the toxicants to be employed in the treating compositions is not critical and may vary considerably provided the required dosage of the effective agent is supplied in the ink, adhesive, soap, detergent, fuel, grease, cutting oil, plasticizer, resin, polymeric material, paint, textile, fabric, paper, wood or growth medium or upon the terrestrial plant foliage or fruit. The concentration of toxicant in liquid compositions generally is from about 0.01 to 50 percent by weight. Concentrations up to 95 percent by weight are oftentimes conveniently employed. In dusts, the concentrations of the toxicant can be from about 0.1 to 95 percent by weight. In compositions to be employed as concentrates, the toxicants can be present in a concentration of from 5 to 98 percent by weight.

In representative operations, each of (3-pyridyl)-(2-thienyl)iodonium chloride hydrochloride and the corresponding trifluoroacetate, (3-pyridyl)-(p-methoxyphenyl)iodonium chloride hydrochloride; and (3-pyridyl)-(p-phenoxyphenyl)iodonium bromide gives 100 percent kill of *Staphylococcus aureus, Bacillus subtilis, Mycobacterium phlei* and *Trichophyton mentagrophytes* when employed in aqueous acetone compositions at a concentration of 500 parts per million by weight.

In further operations, each of (3-pyridyl)-(2-thienyl)iodonium chloride hydrochloride and the corresponding trifluoroacetate gives 100 percent kill of *Pseudomonas aeruginosa, Escherichia coli, Salmonella typhosa* and *Pseudomonas Sp. Strain 10* when employed in aqueous acetone compositions at a concentration of 100 parts per million by weight.

The starting (diacetoxyiodo)pyridine compounds are prepared by reacting a corresponding iodosopyridine with glacial acetic acid according to the following equation:

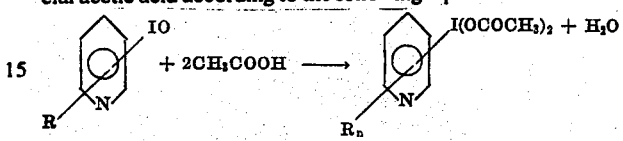

The reaction is advantageously carried out in the presence of glacial acetic acid or a mixture of glacial acetic acid and acetic anhydride as a solvent reaction medium. The amounts of the reactants to be employed are not critical, some of the product being formed when employing any proportions. The reaction consumes the reactants in the ratio of 1 mole of the iodosopyridine compound to 2 moles of acetic acid, and the employment of such proportions is advantageous. However superior yields are obtained when using up to about 10 times the stoichiometric amount of acetic acid. The reaction proceeds at a temperature at which water of reaction is liberated, suitably at a temperature between 0° and 50° C.

In carrying out the reaction, the iodosopyridine and the acetic acid reactant are contacted in any convenient fashion and maintained for a predetermined period of time in the reaction temperature range to complete the reaction. In a representative procedure, the iodosopyridine reactant is added to well-stirred glacial acetic acid. During the addition of the iodosopyridine reactant to the acid and for a period thereafter, the temperature of the reaction mixture is maintained within the reaction temperature range.

Upon completion of the reaction, the desired product is recovered by conventional procedures. To illustrate, excess glacial acetic acid is evaporated under vacuum at a temperature less than 50° C. or may simply be blown off with air at room temperature.

What is claimed is:

1. The compound corresponding to the formula

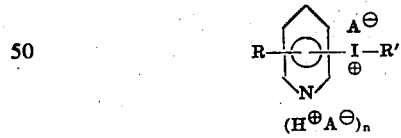

wherein R represents hydrogen, a lower alkyl, an acetamido, a chloro, or a bromo group, R′ represents naphthyl, phenyl, lower alkylphenyl, lower alkoxyphenyl, phenylphenyl phenoxyphenyl, disubstituted phenyl in which the substituents are lower alkyl or lower alkoxy, A$^\ominus$ represents fluoride, chloride, bromide, iodide, trifluoroacetate, trichloroacetate, lower alkanoate, nitrate, acid sulfate or tetrafluoroborate and n represents an integer from 0 to 1.

2. The compound of claim 1 wherein R′ is 2-thienyl, A$^\ominus$ is chloride, and n is 1.

3. The compound of claim 1 wherein R′ is 2-thienyl, A$^\ominus$ is trifluoroacetate and n is 0.

4. The compound of claim 1 wherein R′ is 2-thienyl, A$^\ominus$ is chloride, and n is 0.

5. The compound of claim 1 wherein R′ is p-methoxyphenyl, A$^\ominus$ is chloride, and n is 1.

6. The compound of claim 1 wherein R′ is p-methoxyphenyl, A$^\ominus$ is trifluoroacetate, and n is 0.

7. The compound of claim 1 wherein R′ is p-phenoxyphenyl, A$^\ominus$ is bromide, and n is 0.

8. The compound of claim 1 wherein R′ is p-phenoxyphenyl, A$^\ominus$ is chloride, and n is 0.

* * * * *